(12) United States Patent
Oram

(10) Patent No.: US 9,417,459 B2
(45) Date of Patent: Aug. 16, 2016

(54) EYEGLASSES WITH INTEGRAL HEAD AND HAIR SECUREMENT DEVICES, AND HEAD AND HAIR SECUREMENT DEVICES FOR EYEGLASSES AND METHODS OF MAKING AND USING THE SAME

(71) Applicant: Nancy M Oram, Birmingham, MI (US)

(72) Inventor: Nancy M Oram, Birmingham, MI (US)

( * ) Notice: Subject to any disclaimer, the term of this patent is extended or adjusted under 35 U.S.C. 154(b) by 0 days.

(21) Appl. No.: 14/004,871

(22) PCT Filed: Sep. 5, 2013

(86) PCT No.: PCT/US2013/058334
§ 371 (c)(1),
(2) Date: Sep. 12, 2013

(87) PCT Pub. No.: WO2014/039725
PCT Pub. Date: Mar. 13, 2014

(65) Prior Publication Data
US 2014/0071397 A1    Mar. 13, 2014

Related U.S. Application Data

(60) Provisional application No. 61/697,139, filed on Sep. 5, 2012.

(51) Int. Cl.
*G02C 3/00* (2006.01)
*G02C 13/00* (2006.01)
*A45D 8/36* (2006.01)
*G02C 11/00* (2006.01)

(52) U.S. Cl.
CPC ............... *G02C 3/006* (2013.01); *G02C 11/00* (2013.01); *G02C 13/001* (2013.01); *A45D 8/36* (2013.01)

(58) Field of Classification Search
CPC ...... G02C 11/00; G02C 13/001; G02C 3/006; G02C 3/00; G02C 13/00; A45D 8/36
USPC ......... 351/111, 117, 122, 123, 158, 155, 178; D16/300, 309; 362/507; 2/428, 431; 132/163–219, 273
See application file for complete search history.

(56) References Cited

U.S. PATENT DOCUMENTS

| | | | | |
|---|---|---|---|---|
| 5,471,258 A * | 11/1995 | Hsieh | ............................. | 351/123 |
| 5,610,669 A * | 3/1997 | Kuipers et al. | ................ | 351/122 |
| 5,706,836 A * | 1/1998 | McKeown | .................... | 132/144 |
| 6,530,659 B1 * | 3/2003 | Marcum | ......................... | 351/41 |
| 6,692,124 B2 * | 2/2004 | Katz | ...................... | G02C 11/08 2/435 |
| 7,347,544 B1 * | 3/2008 | McLaughlin | .................... | 351/41 |
| 7,703,913 B2 * | 4/2010 | Huang | ........................... | 351/110 |
| 2004/0025232 A1 * | 2/2004 | Hartley et al. | .................... | 2/452 |
| 2010/0228689 A1 * | 9/2010 | Hall | ............................. | 705/500 |
| 2011/0234971 A1 * | 9/2011 | Yeh | .............................. | 351/111 |
| 2014/0071397 A1 * | 3/2014 | Oram | ............................ | 351/123 |

* cited by examiner

*Primary Examiner* — Bumsuk Won
*Assistant Examiner* — Grant Gagnon
(74) *Attorney, Agent, or Firm* — Cargill & Associates PLLC; Lynn E Cargill

(57) ABSTRACT

Hair securement devices are included on eyeglasses to help resist slippage off the head of a person wearing their eyeglasses on top of their head, when not is use. The hair securement devices are located on the inwardly facing surface of the lower inner frame of the glasses, in a place where they do not touch the face of the wearer when they are in place on the wearer. The hair securement devices may be a toothed device, or may be a suitable type of protrusion that will stick into the hair of the wearer, and resist slippage. Furthermore, methods of making the eyeglass with an integral hair securement device are disclosed, as are methods of making a separate hair securement device to be adhered to a pair of eyeglasses. A method of using the device is also disclosed.

18 Claims, 15 Drawing Sheets

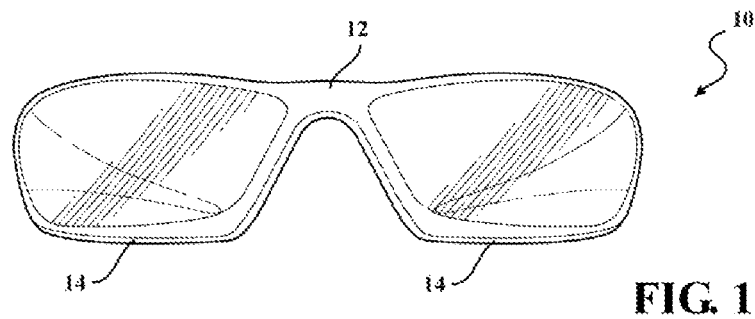
FIG. 10A
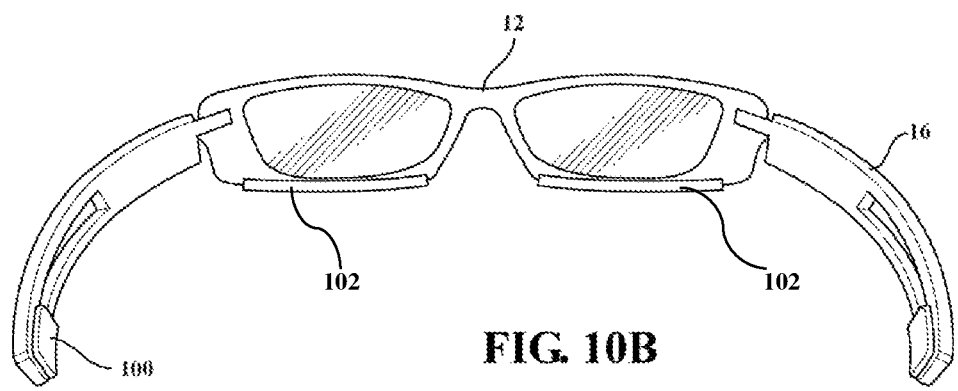
FIG. 10B
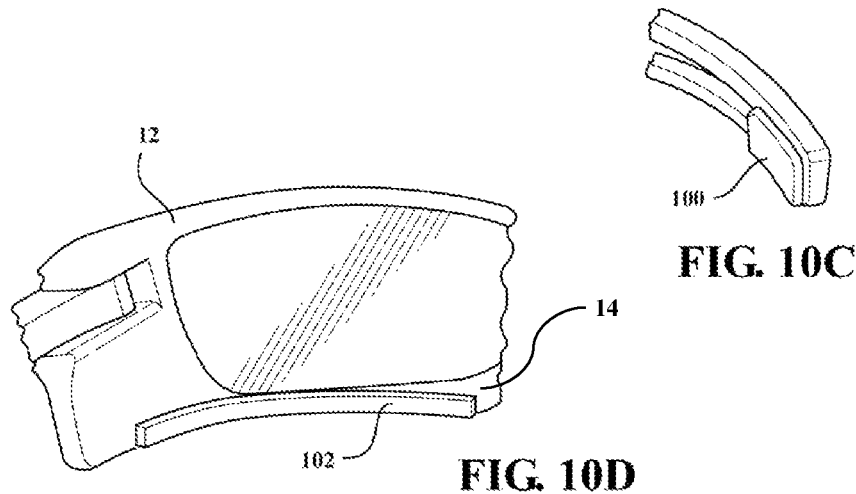
FIG. 10C
FIG. 10D ures" have been used for a long time. However, they do not address the same problem that has been conquered by the invention of this disclosure. The presently addressed problem occurs when conventional glasses are slid back on top of one's head, and the prior art devices do not secure the glasses to the top of the head. Rather, they secure the glasses around the neck or chest of the wearer. Laying the glasses down on your chest, while being attached to a cord, is a different consideration, and needs a different solution for sliding the glasses up onto the top of the head of the wearer. Practitioners of these conventional prior art inventions did not address the issue of putting the glasses on the top of the head.

EYEGLASSES WITH INTEGRAL HEAD AND HAIR SECUREMENT DEVICES, AND HEAD AND HAIR SECUREMENT DEVICES FOR EYEGLASSES AND METHODS OF MAKING AND USING THE SAME

CROSS-REFERENCE TO RELATED APPLICATIONS

This application claims the benefit under 35 U.S.C. 119(e) of U.S. Provisional Application No. 61/697139 filed on Sep. 5, 2012.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED, INCLUDING ON A COMPACT DISC

Not Applicable

BACKGROUND OF THE INVENTION

1. Field of the Invention

The present invention relates to eyeglasses of all types with integral inwardly facing head securement devices, as well as separate head securement devices that are attachable to all types of existing eyeglasses, and methods of manufacturing and using same. More particularly, the invention relates to eyeglasses with head securement devices to prevent the glasses from sliding off the top of one's head.

2. Description of the Prior Art

Conventional eyeglasses are well known in the art, including one of the most common types of eyeglasses, i.e. sunglasses. Within the body of this writing, we will interchangeably refer to any type of eyeglasses, such as optical eyeglasses, readers, sunglasses, and my own aftermarket kits made in accordance with the present invention, as all of their functional structures are substantially identical. The concept of the present invention works on any of these eyeglass configurations. Since a majority of people wear sunglasses, including those people that normally do not wear eyeglasses, it is a common experience for those people to forget that they have glasses on when they slide the sunglasses back up on top of their head to get them out of the way. A problem arises when that person is jostled or bends forward or backward, and the sunglasses that once had been slid up on top of their head, now slips down through their hair and falls off their head. So, to prevent their glasses from falling off their head, it would be advantageous to have a hair or head securement device to hold them on their head.

Previous attempts to solve this problem have included the use of cords, ear clips, spring designs for going over the ears, and various other sorts of elastic bands. Most of these devices are used for sporting activities and they secure the eyeglasses around the head of the wearer while they are being used. In order to keep a pair of glasses attached to a wearer so as not to lose them, conventional "frog-type" (Croakies style) and wet-suit material cords, along with librarian-type "peepers keep- Further, if a user is also wearing some sort of head ornament or headband, and they then slide their glasses up on top of their head, the glasses are less prone to falling off when they tilt downward due to the interference with the head ornament. There are other complexities which give rise to entangling the glasses with the head ornament, and pulling on one's hair after they have placed the glasses on top of their head. Moreover, when a wearer needs to wear two pairs of glasses, such as in the instance of wearing prescription glasses with clear lenses, and an additional pair of sunglasses, the glasses are also more prone to falling off the head.

Therefore, it would be desirable to the eyeglass, sunglass and reader glasses industry if there could be provided a hair or head securement device which comfortably and conveniently secured glasses firmly on top of your head to reduce the chance of the glasses falling off. It would also be desirable for the technology to either be integral with the body of the eyeglasses or if it could be available as a separate aftermarket piece that could be adhered to the lower inner frame and/or the inner temples of the eyeglasses or readers. Such a hair securement device would help to secure the eyeglasses to the top of the head of a person after they were leaning down. Furthermore, methods of making the eyeglass with an integral hair securement device are disclosed, as are methods of making a separate hair securement device to be adhered to a pair of eyeglasses, readers or sunglasses. A method of using the device is also disclosed.

SUMMARY OF THE INVENTION

In accordance with the above-noted desires of the industry, the present invention provides many and various aspects of a solution to the problem of eyeglasses falling or slipping off when worn on top of one's head. This invention involves a means to comfortably and conveniently secure eyeglasses, readers or sunglasses firmly on one's head that can be called "grip-on" technology, embodied by tooth-like hair or head securement devices or enhancements located on inwardly facing surfaces of the eyeglasses, such as on the lower or upper inner frame and/or the inner temples of the eyewear frame. These tooth-like hair securement devices grip in one's hair when the eyeglasses are worn as an accessory on top of their head, preventing glasses from damage, slipping, or even loss. Further disclosed is a method of securing the hair attachments into one's hair by sliding the glasses up onto the top of your head, similar to wearing a headband. We take notice that not everyone has hair on their head, yet the present securement devices are to be used by everyone, whether they have lots of hair, little hair, or no hair. In that regard, throughout this application, we shall refer to the teeth-like hair securement devices, even though it is acknowledged that they can be used with little to no hair at all.

My invention includes many different aspects of hair securement attachments, including forming eyeglasses or any other type of glasses, like readers, with integral hair securement devices made right into either the entire inner frame or the lower inner frame, or the manufacture of a separate aftermarket piece having my hair securement devices meant to be adhered to the lower of a pre-existing pair of eyeglasses. Further, various securement devices are disclosed that are to be adhered to the temple arms or sides of the glasses. Each aspect include eyeglasses that resist slippage on a head of a wearer, including an eyeglass frame having a top section and two lower inner frame sections. The lower inner frame sections are on both sides of the frame, extending downwardly and inwardly from the top section of the eyeglass frame. The lower inner frames have an inwardly facing surface, and temples extend from the eyeglass frame for securing the eyeglasses to the head of the wearer. The hair securement devices are located on the inwardly facing surface of the lower inner frame sections of the eyeglass frame, and the hair securement devices protrude toward the face of the person wearing the eyeglasses.

Methods of making the hair securement devices may include injection molding, overmolding, or any method of forming suitable materials. Suitable materials to be used in practicing the method may include plastics and rubbers, such as thermoplastic elastomers including thermoplastic vulcanizates (hereinafter "TPV"), along with other elastomers, such as synthetic rubbers like ethylene propylene diene monomers (hereinafter "EPDM"), polypropylene, plastics, acetate, various suitable foams, and combinations thereof. As such, this invention overcomes most of the aforementioned problems with the prior art because it helps to secure the eyeglasses to the top of the head when not in use.

In the remainder of this disclosure, all aspects will include my grip-on technology, meaning that any type of eyewear, which includes eyeglasses, readers, sunglasses, safety glasses, rimless glasses or readers, or optical eyeglasses, will include at least one head or hair securement device that is either formed into a new pair of glasses or has a hair securement device-containing aftermarket part attached to the inwardly facing part of an inner frame or inner temples of the glasses. In other words, the hair securement device may include teeth, teeth-like structures, decorative protrusions, ribbed pads, or anything else that will grip the head of a user when their glasses are slid up onto their head. Bald people and persons with hair, alike, will benefit from the grip-on technology which will comfortably and conveniently secure their glasses to their head.

A first preferred aspect of the grip-on technology of the present invention includes teeth-like hair securement devices that are manifested as integrally formed, low profile teeth located on the inwardly facing lower inner frame of a pair of eyeglasses. These teeth-like devices are sufficiently tall and wide so that they may grip the hair of the wearer when the glasses are slid up on top of the head. The teeth-like devices are preferably low profile with a shallow draft having smooth edges, such that the teeth-like devices may have nearly any shape, although a rounded frusto-conical shape is most preferred. The teeth may be from 0.001" tall to 1 inch tall, and have wider dimensions at their base. As discussed more fully hereinbelow, the hair securements and/or teeth may have many different structural and functional configurations, including smoothly surfaced bump-like protrusions. In their location on the inwardly facing lower inner frame of the eyeglasses, the hair gripping teeth-like devices of the present invention do not generally touch the face of the eyeglass wearer. Any structural component that can be used as a hair securement on any inwardly facing surface of the glasses is within the scope of the present invention.

Therefore, to practice my invention, it may be done so regardless of whether the teeth-like devices are molded right into the lower inner frame, the entire inner frame and inner temples of the glasses, or as an aftermarket application where the teeth-like devices are added after the glasses are made. All of these aspects are within my invention. Further, as will be seen upon reviewing the disclosure below, in practicing my invention, the teeth can either be short or tall, pointed, shallow, rounded, decorative or functional, and still be a part of my invention.

Another aspect of the invention includes decorative yet functional teeth, including such decorative elements as half round pearl decorations, half round rhinestones, or the like attached to the interior facing portion of the lower inner frame of the eyeglasses. The decorative elements may also function to secure the glasses onto the wearer. While these elements may be made of any material, it is their location and functionality that brings it within the realm of this invention.

Yet another aspect of the present invention includes an aftermarket strip having similar securements and/or teeth from the aspects noted above, except these teeth will be located on a channel or strip of material that can be adhered to the lower inner frame of the eyeglasses, such that an existing pair of glasses can be retrofitted to utilize the basic concept of present invention.

The method of making the head or hair securing glasses and/or the channel or strip of material with the teeth thereon may best be accomplished by molding, forming and shaping plastic or synthetic rubber into eyeglasses or my retrofit strips/channels by injection molding, over molding, or slip casting a plastic or rubbery material in a cavity mold. For metal glass frames, any conventional method of manufacture may be used and, in this aspect, stamped out teeth-like securements would be appropriate. Such suitable methods may include not only the injection molding of the eyeglasses made in accordance with the present invention, but also the casting or molding of the aftermarket channel or strip of material with teeth thereon.

The teeth-like devices that are prevalent throughout all the aspects of the present invention may either be made of rigid materials, semi-soft materials, soft materials, rigid materials coated with soft materials, or any other material that is suitable for catching or securing within one's hair. With regards to the soft materials, a rubber material is highly desirable because it has a surface which acts as a friction point against human hair. As described more fully hereinbelow, any suitable material may be utilized for the teeth, including soft, semi-soft, or hard durometer plastic materials, soft, semi-soft, or hard durometer rubbers, plastic pearls, rhinestones, or other decorative elements that include an aspect ratio of from about 0.001 to about 1000. The teeth may extend across the entire inner frame, just the lower inner frame, or any combination of either with the inner temples of the eyeglass frame, or any portion thereof, as long as it is effective for securing hair. It is also envisioned that some of the configurations of the teeth will also be suitable for bald persons to find benefit by using the present invention.

This invention is particularly useful for applications on sunglasses, readers and optical eyeglasses, and although it will be described by way of examples hereinbelow for specific embodiments having certain features, it must also be realized that minor modifications, that do not require undo experimentation on the part of the practitioner, are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different embodiments and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein:

FIG. 10A is a front view of safety glasses;

FIG. 10B is a rear view of the glasses with sticky pad type securements on the inner frame and inner temples;

FIGS. 10C and D are close ups of the securements of FIG. 10B;

DETAILED DESCRIPTION OF THE INVENTION

Figure 1A:
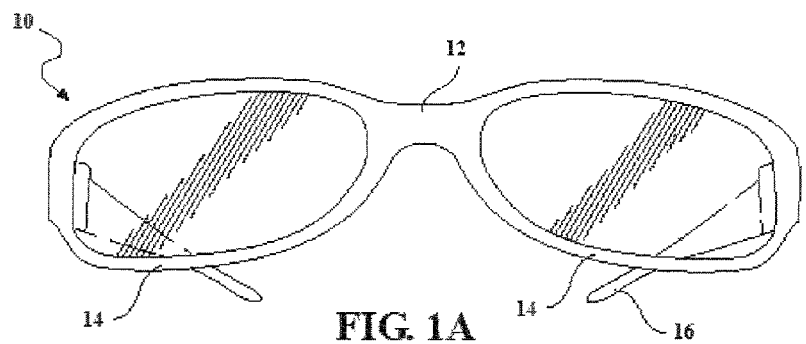
FIG. 1A is a front elevational view of a pair of eyeglasses.

For a further understanding of the nature and advantages of the expected scope and various embodiments of the present invention, reference shall be made to the following detailed description, and when taken in conjunction with the accompanying drawings, in which like parts are given the same reference numerals, and wherein the following descriptions of the various aspects of the invention follow a format.

FIG. 1A-1C

Figure 1B:
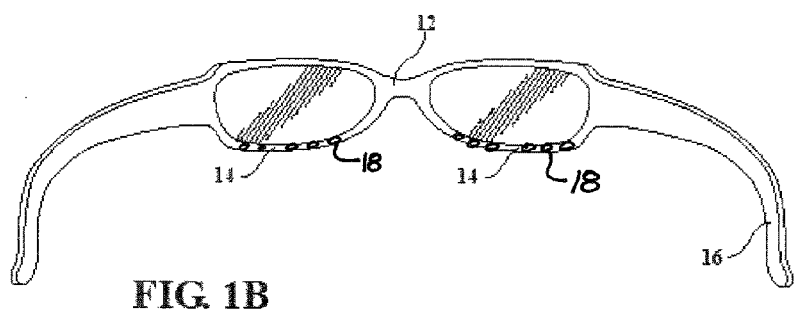
FIG. 1B is a rear elevational view of a pair of eyeglasses with securements.
Figure 1C:
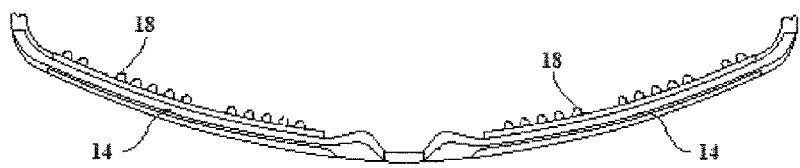
FIG. 1C is a bottom plan view of the securements.

Referring first to FIGS. 1A-1C and the drawings in detail, and referring collectively to the elements shown in FIGS. 1A-1C with like numerals, it can be seen that a first aspect of the present invention is illustrated in FIG. 1A, which is a front elevational view of a pair of eyeglasses with hair securement devices made in accordance with the present invention. The eyeglasses are generally indicated by the numeral 10, and include a frame 12 with a lower inner frame 14 and temple arms 16. Novel teeth 18 are located on the inwardly facing portion of lower inner frame 14, and extend along the length of inner frame 14, such that when eyeglasses 10 are placed up on one's head, teeth 18 become partially secured to the hair on one's head. The teeth may be from 0.001" tall to 1 inch tall, and have a similar or larger width at their base.

The teeth generally do not touch the face of the wearer when the glasses are being worn in the proper fashion and location on the wearer's nose. If the teeth are too proud from the inner surface of the lower inner frame, they might touch the wearer's face. Under most normal circumstances, this would not be desirable. Any suitable size, shape or type of teeth, regardless of the dimension or shape, is within the scope of the present invention. For most applications, a frusto-conically shaped "tooth" with a rounded shape of base would be preferable, although square peg-like teeth, or any other shape, may also be useful.

In order to describe all the potential features that may be realized by the various aspects of this invention, their details will be provided by the following examples. Of course, these examples by no means limit the invention, but rather serve to provide various aspects of the present invention as an illustration for the reader that teaches the many ways that the present invention can be utilized. All aspects of the present invention shall meet or exceed American National Standards Institute (ANSI) requirements.

FIG. 2A-2D

Figure 2A:
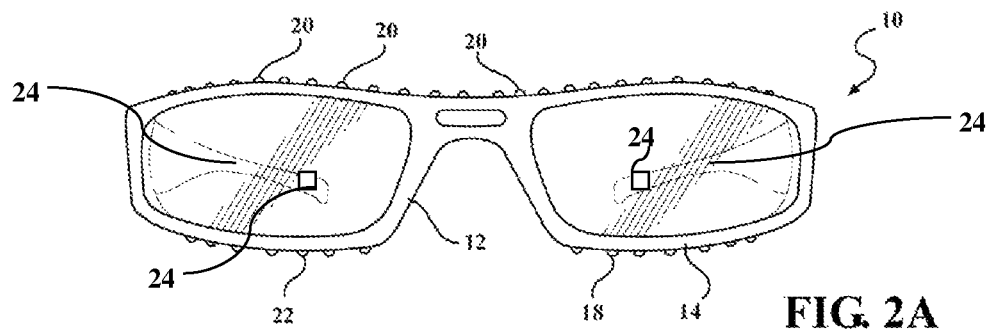
FIG. 2A is a front elevational view showing decorative and functional elements.
Figure 2B:
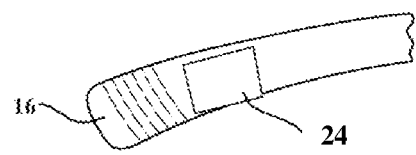
FIG. 2B is an illustration of a securement device on an inner temple.
Figure 2C:
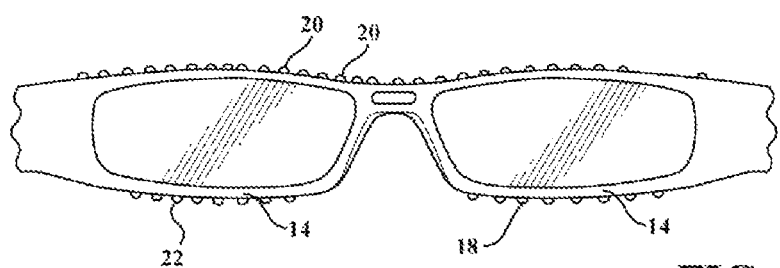
FIG. 2C is an illustration of reader glasses with securements.

Referring next to FIGS. 2A-2D drawings in detail, and referring collectively to the elements shown in FIGS. 2A-2D with like numerals, it can be seen that FIG. 2A is a front elevational view of a pair of eyeglasses, again generally indicated by the numeral 10. Eyeglasses 10 include a frame 12 with a lower inner frame 14 and temple arms 16 that will also now include a pair of hair securement pads 24 in accordance with the present invention. FIG. 2B illustrates the relative placement of these novel hair securement pads 22 to be secured to the inwardly facing surface of temple arms 16, while FIG. 2C shows more detail of a possible configuration of functional and decorative teeth 18 and 22, respectively, along with their placement.

Figure 2D:
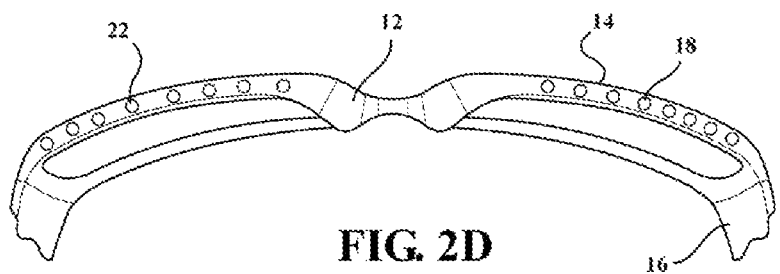
FIG. 2D is a bottom plan view of securements molded into plastic glasses.
Figure 3A:
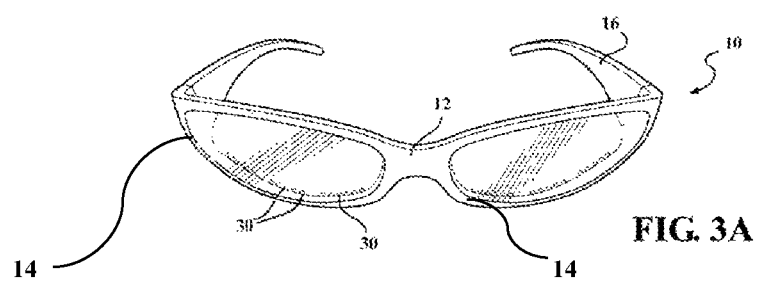
FIG. 3A is a perspective view of sunglasses with securements on inner frame.
Figure 3B:
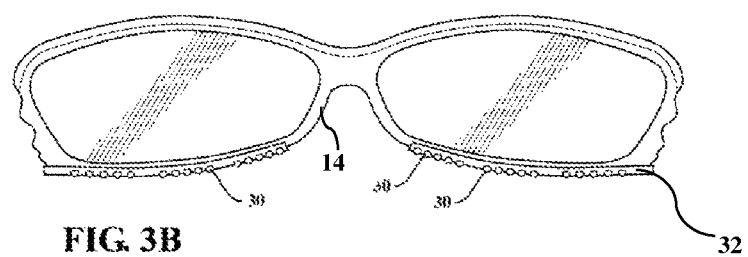
FIG. 3B is a rear perspective view of an aftermarket strip with securements attached to the sunglasses.
Figure 3C:
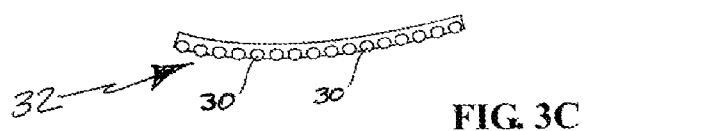
FIG. 3C is a close up view of the securements on the adhesive aftermarket strip.
Figure 3D:
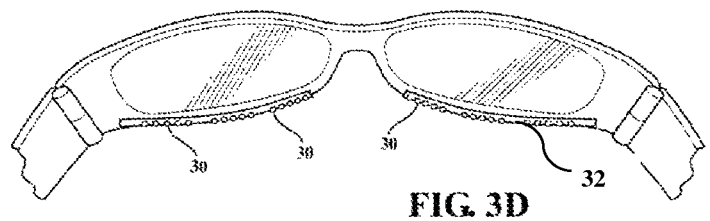
FIG. 3D is a rear view of securements on metal glasses.

As such, FIG. 2D shows a bottom view of the frame 12 with the functional and decorative elements 18 and 22 in position. These novel functional and decorative teeth 18 and 22 are shown as located on the bottom of lower inner frame 14, but may also be located on the inwardly facing portion of lower inner frame 14. Decorative elements 20 may also extend across the top of the frame 12. And again, when eyeglasses 10 are placed up on one's head, teeth 18 and 22 may become partially secured to the hair on one's head to prevent, or slow down, the eyeglasses from falling off one's head.

Functional teeth 18 may be preferably made of a softer rubber or rubber-like material to act more positively as a hair securement device, while decorative teeth 22 may be more forwardly secured so that they match the decorative bits 20 on the top of the eyeglasses 10. These decorative bits may include rhinestones, rubbery material bumps, pearls or imitation pearls, or any other type of decorative bump-like material or bits. These functional and/or decorative pieces can be any suitable material. The hair securements 18 on the lower inner frame 14 of eyeglasses 10 will more or less "catch" a person's hair when the eyeglasses are slid back on top of their head, rather than down on their nose. Since each person's hair has a different texture, it is likely that they will try on different eyeglasses and select the tooth configuration and consistency that might work best for them. This is true for all the aspects of the present invention being disclosed herein.

FIG. 3A-3D

Looking next to FIG. 3A through FIG. 3D, "toothed" strips 32, such as rubber strips are disclosed. Strips 32 can be manufactured separately from the eyeglasses themselves, and can be sold as aftermarket pieces. Glasses 10 include frames 12 with lower inner frames 14 and temple arms 16. The toothed strips 32 are glued or otherwise secured to the inwardly facing surface of the lower inner frames 14 of eyeglasses 10. These "toothed" strips 32 may be utilized to yield yet another aspect of the present invention, as is shown with rubber teeth 30 disposed on the surface of strips 32 adhered to lower inner frame 14 of eyeglasses and facing inwardly to become engaged in the hair of the wearer when the eyeglasses are slid back up on the top of the head of the wearer. Note that although the toothy strip is adhered to the inside of the lower inner frame 14, the teeth do not generally touch the face of the wearer, because the lower inner frame 14 of the frame 12 rarely, if ever, touches the face. Various combinations of suitable materials and designs are further discussed and detailed hereinbelow.

FIG. 4A-4C

Figure 4A:
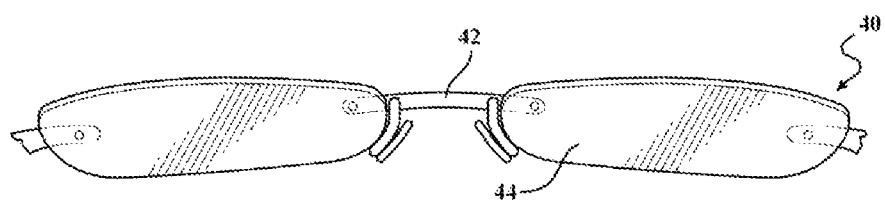
FIG. 4A is a front view of rimless readers.
Figure 4B:
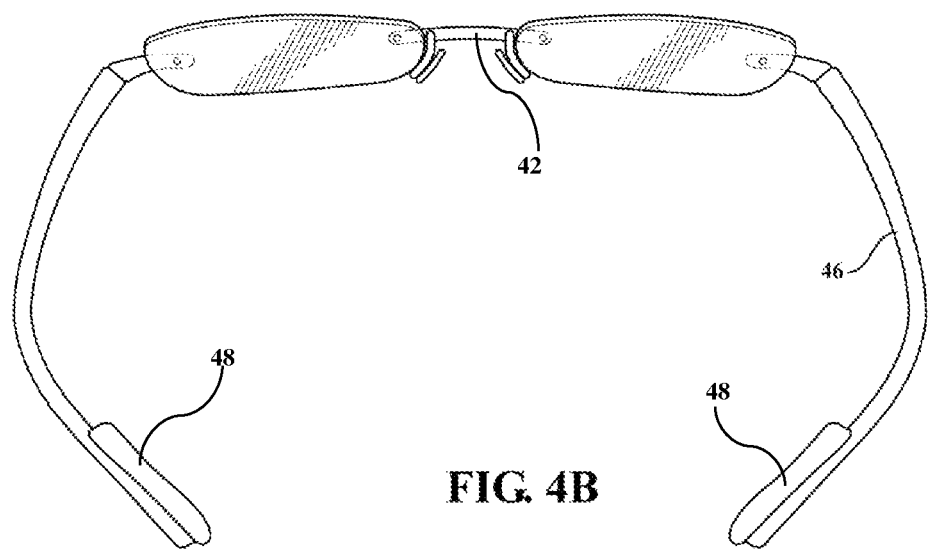
FIG. 4B is a rear view of rimless readers with securements on inner temples.
Figure 4C:
FIG. 4C is a top plan view of the securements on the temple tips.

FIGS. 4A-4C illustrate a pair of rimless glasses 40 which would require a different approach, such as the addition of a nonslip pad 48 as shown in FIG. 4C. Suitable materials and design and shape of the appropriate hair securement devices for this aspect as the same as the previously discussed aspects hereinabove. In this aspect, glasses 40 are of a wireless or rimless style, having a nose bridge 42 and lenses 44. The various components, such as the nose bridge 42 and temple arms 46 are traditionally fastened to glass lenses 44 by drilling holes in glasses 44 and securing them through screws and/or other mechanical fasteners. Nonslip pads 48 are adhered to the inwardly facing portion of temple arms 46.

FIGS. 5A-5B

Figure 5A:
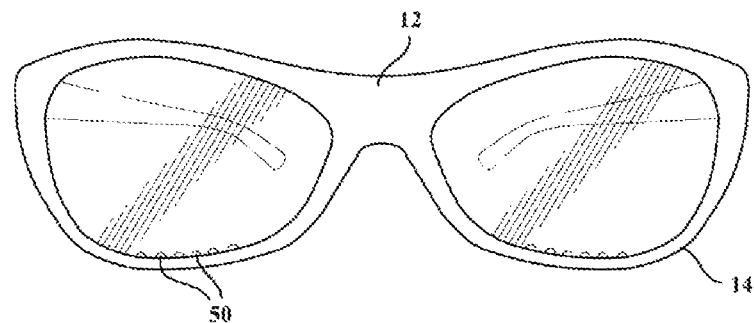
FIG. 5A is a front view of sunglasses with integral hair securement devices.
Figure 5B:
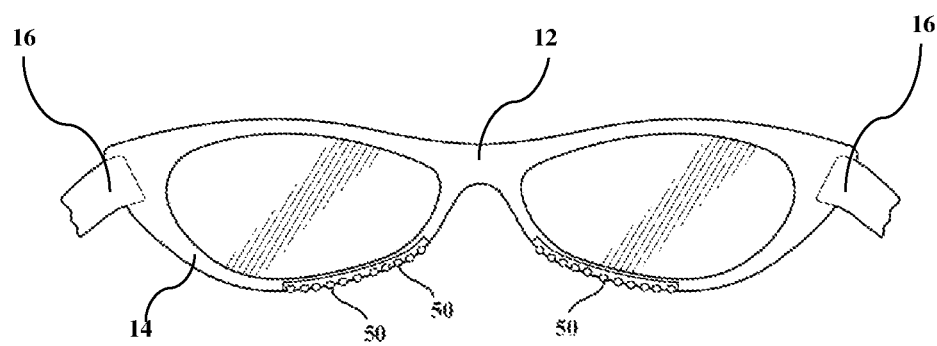
FIG. 5B is a rear view of the glasses of FIG. 5A.

FIGS. 5A-5B show another aspect of the present invention, in which the collective element of my eyeglasses 10 still include frame 12, lower inner frame 14 and temple arms 16, but now disclosed is a different aspect of my invention, in which from about 20 to about 100 teeth 50 are molded into the lower inner frame 14 as an integral part of the frame 12. In all the examples herein, the teeth 50 can either be integrally molded into the eyeglass frame 12 itself, formed into strips that are then secured or otherwise adhered to the glasses, or the teeth 50 can be an aftermarket modification kit, as more fully described hereinafter. These teeth 50 can be fastened onto an existing pair of glasses or prescription glasses.

FIG. 6A-6C

Figure 6A:
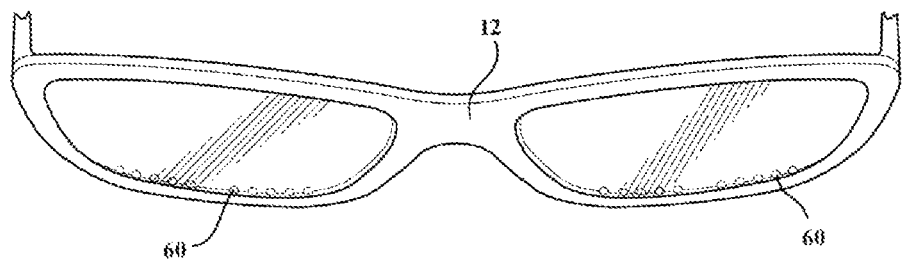
FIG. 6A is a front view of optical eyeglasses with integral securements.
Figure 6B:
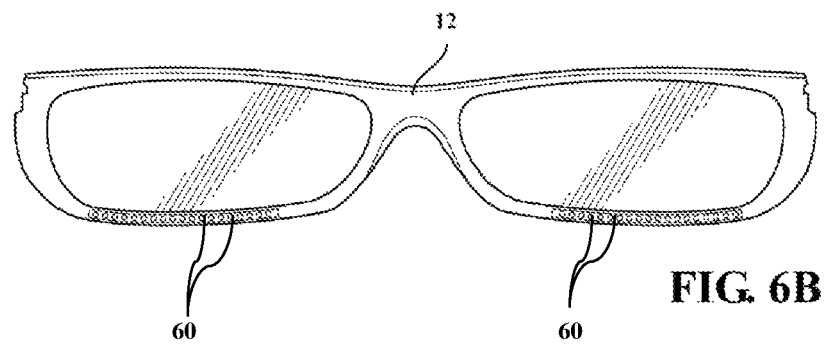
FIG. 6B is a rear view of FIG. 6A.
Figure 6C:
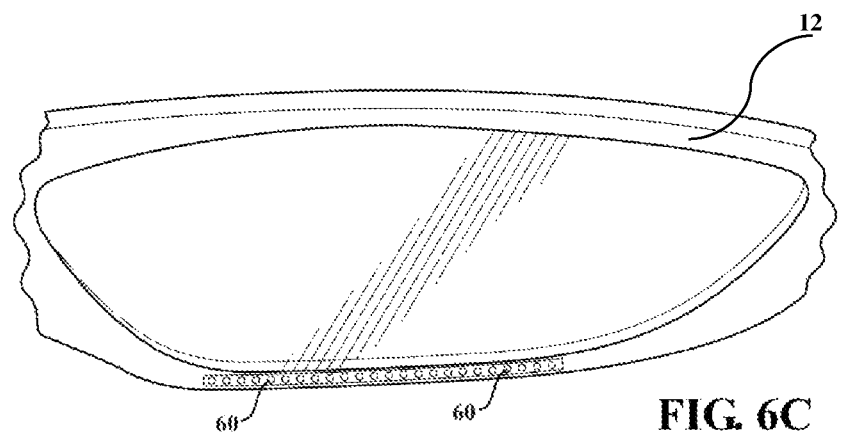
FIG. 6C is a close up rear view of FIG. 6A.

FIGS. 6A-6C illustrate yet another aspect of my invention, in which glasses 10 are actually reading glasses or prescription glasses with teeth 60 (from about 2-100 teeth on each side) that cover the entire area defined by lower inner frame 14, from one end to the other. The various parameters for materials, locations on the glasses for the hair securement devices, and usage that are disclosed for this aspect are the same as for the examples discussed above.

FIGS. 7A-7C

Figure 7A:
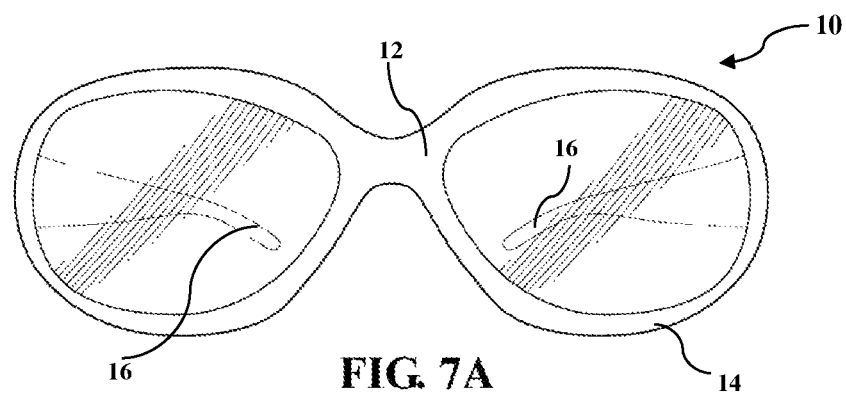
FIG. 7A is a front view of sunglasses with integral securements.
Figure 7B:
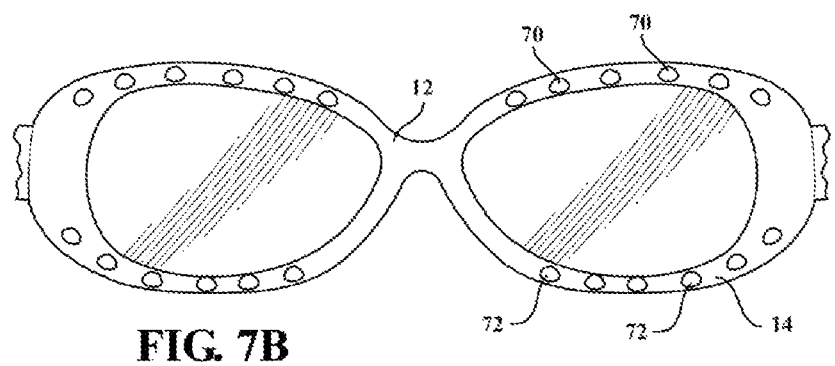
FIG. 7B is a rear view of FIG. 7A with decorative elements on the inward side.
Figure 7C:
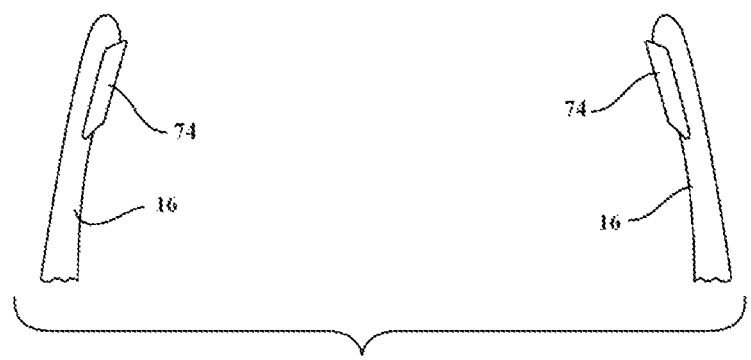
FIG. 7C shows the relative placement of inner temple securements.

FIGS. 7A-7C illustrate yet another aspect of my invention, in which the glasses include decorative elements 70 on the outwardly facing portion of frame 12, both across the top of frame 12 as well as along the lower inner frame 14 with decorative elements 72. In order to enhance the securement of the glasses once they have been put on top of one's head, FIG. 7C illustrates the relative placement of non-slip pads 74 adhered to the inwardly facing portion of temple arms 16. The possible materials and configuration of the non-slip pads are detailed hereinbelow.

FIGS. 8A-8C

Figure 8A:
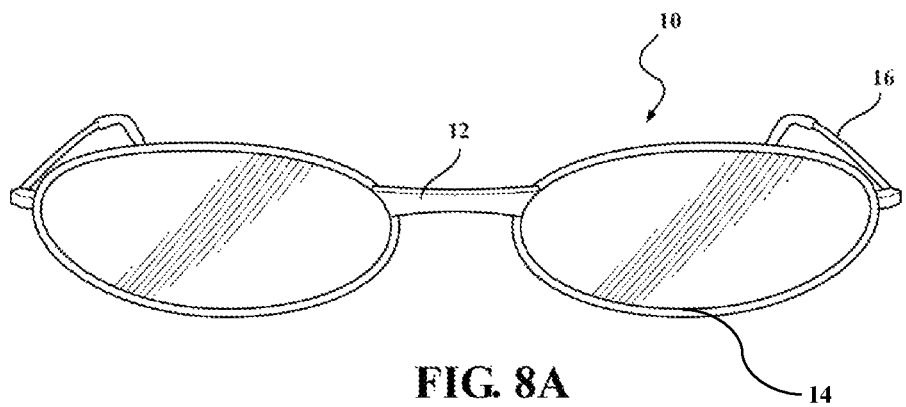
FIG. 8A is a front view of wire rim glasses.
Figure 8B:
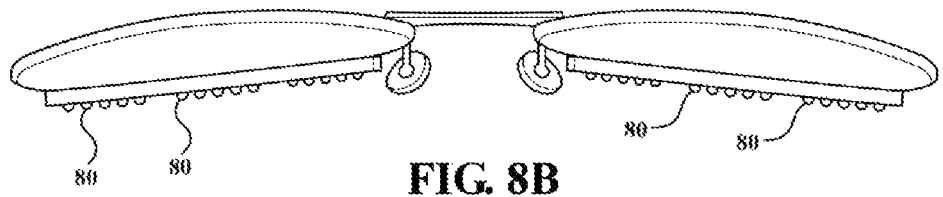
FIG. 8B is a bottom plan view of the wire rim glasses with securements.
Figure 8C:
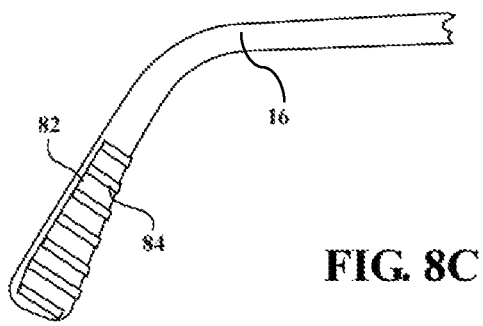
FIG. 8C is a perspective view of ribbed securements on inner temples.

FIGS. 8A-8C illustrate yet another aspect of my invention, in which the glasses 10 are metal rimmed glasses having a nose bridge 12 and temple arms 16. Further, in this aspect of the present invention, teeth 80 are included along an inwardly facing surface along the inside of the lower inner frame as shown in FIG. 8B, while FIG. 8C illustrates a non-slip rubber-like pad 82 adhered to or formed into the temple arms 16. The non-slip pad 82 has optional ribs or teeth 84 for gripping the head of the wearer and/or acting as a hair securement device. As in all these examples, this ribbed or toothed non-slip pad can be integrated along the entire inner temple, and depending on the type of glasses, the optimal placement of the teeth may be toward the front of the temple tips.

FIGS. 9A-9C

Figure 9A:
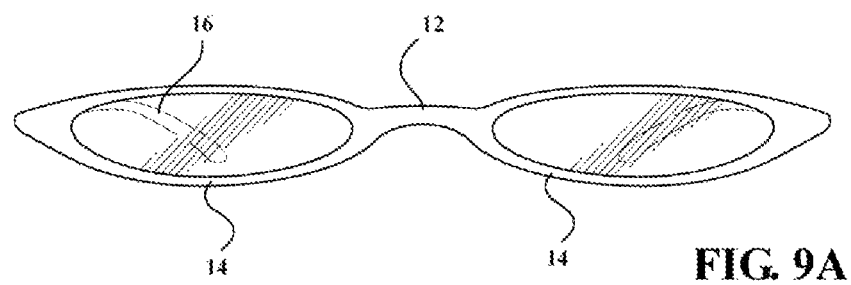
FIG. 9A is a front view of metal optical eyeglasses.
Figure 9B:
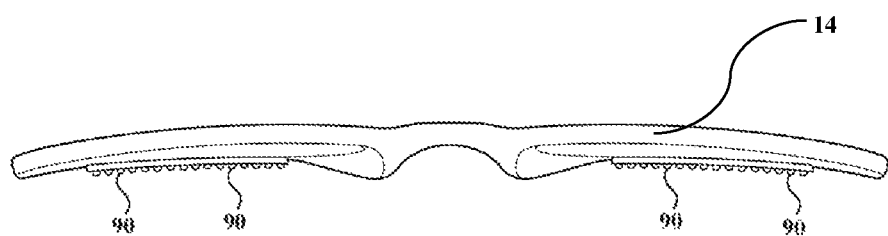
FIG. 9B is a bottom plan view of the glasses of FIG. 9A with attachable strip aftermarket securements.
Figure 9C:
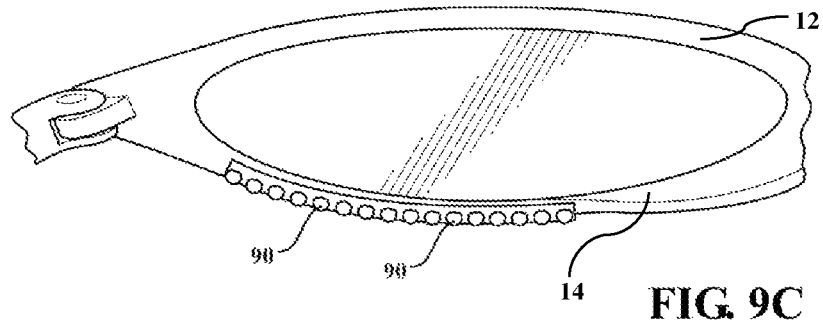
FIG. 9C is a close up of an attachable aftermarket strip with securements attached.

FIGS. 9A-9C illustrate further yet another aspect of my invention, in which the glasses 10 are either plastic or acrylic with glass lenses, typical of a drugstore-type reading glass. In this aspect, teeth 90 are only secured in the centermost ⅔ of the lower inner frame, and work quite efficiently for keeping the glasses from falling off one's head. As always, the teeth may either be integrally formed into the glasses or added thereafter.

FIGS. 10A-10D

FIGS. 10A-10D illustrate another aspect of my invention, in which FIG. 10A is a front view of safety glasses; FIG. 10B is a rear view of the glasses with sticky pad type securements 102 on the inner frame and inner temples; and FIG's 10C and D are close ups of the securements of FIG. 10B.

FIGS. 11A-11D

Figure 11A:
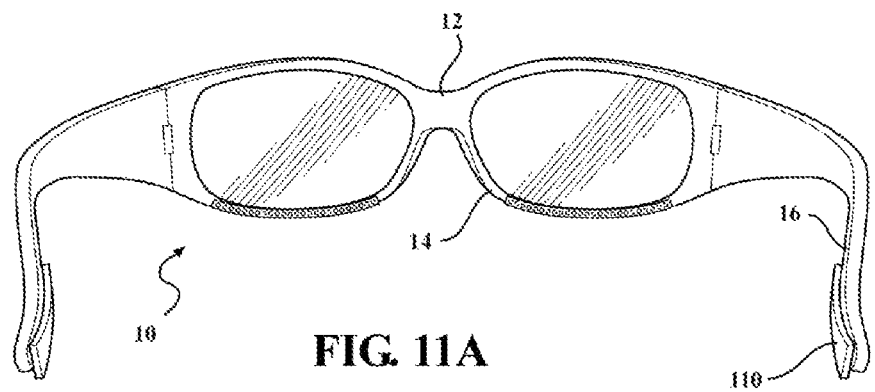
FIG. 11A is a rear view of sports glasses with securements.
Figure 11B:
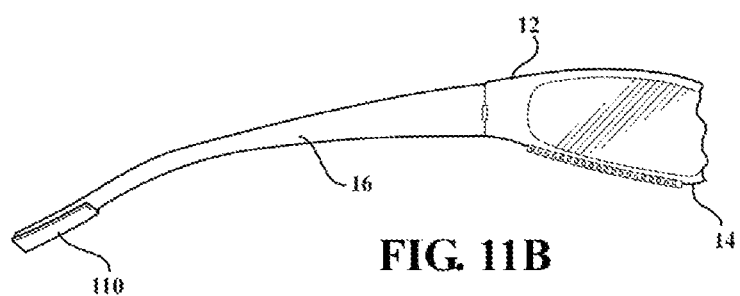
FIG. 11B is a close up of the securements in place on the sports glasses.
Figure 11C:
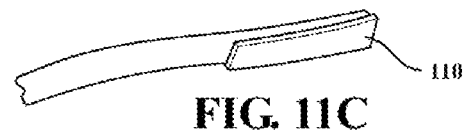
FIGS. 11C and D are close ups of the securements of FIG. 11B.
Figure 11D:
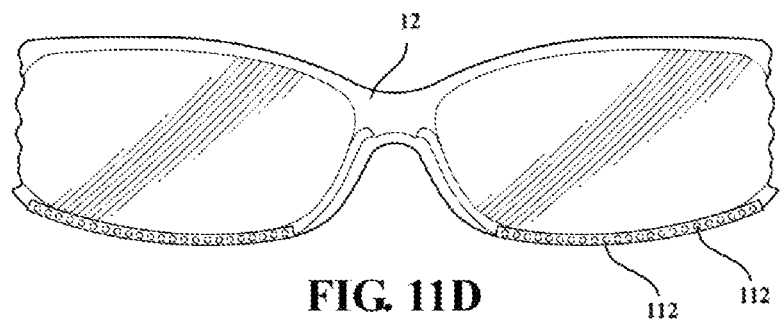

FIGS. 11A-11D illustrate yet another aspect of my invention, in which the glasses 10 are sport glasses, incorporating teeth 112 substantially all across the lower inner frame 14 of frame 12. Non-slip pads 110 are adhered to temple arms 16, as shown in FIGS. 11A-11C. FIG. 11D shows a close-up of the teeth 110 and their relative placement along the lower inner frame 14's inwardly facing surface. Teeth 110 may also be located along the inwardly facing surface of the lower inner frame and inner temple 14 and 16, respectively.

FIGS. 12A-12C

Figure 12A:
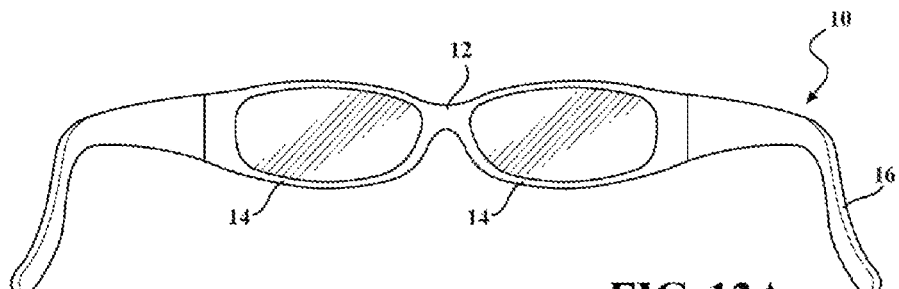
FIG. 12A is a front elevational view of sunglasses.
Figure 12B:
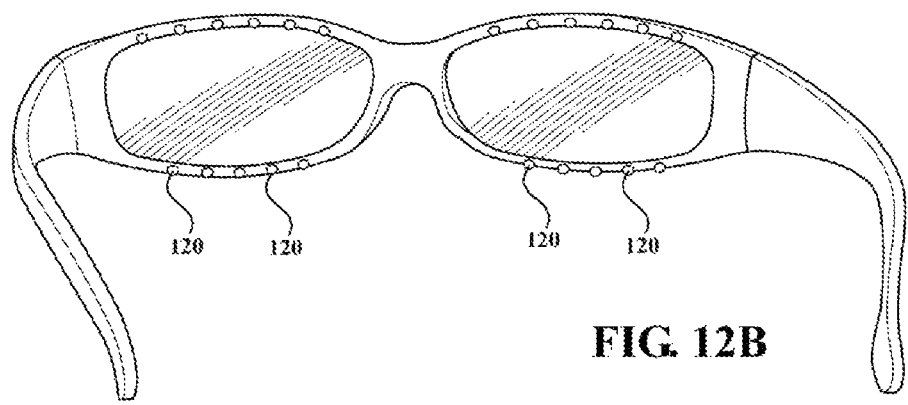
FIG. 12B is a rear elevational view of the sunglasses with securements on both the upper and lower inner frames.
Figure 12C:
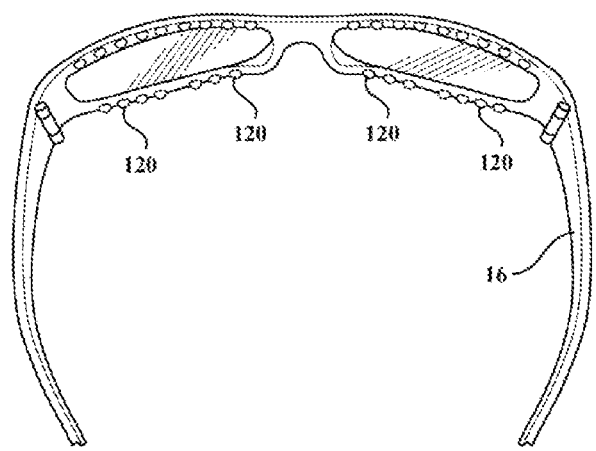
FIG. 12C is a bottom perspective view showing an effective location of securements.

FIGS. 12A-12C illustrate yet another aspect of my invention, in which the glasses 10 are fashion glasses made of plastic, and where teeth 120 are "raindrop" design non-slip material bits that are located on lower inner frame 14 of glass frame 12. These "raindrop" bits are soft or hard molded plastic rounded drop-like pieces which function as hair securement devices. Temple arms 16 also have any hair securement devices, such as the non-slip pad of previous aspects of the present invention.

FIGS. 13A-13C

Figure 13A:
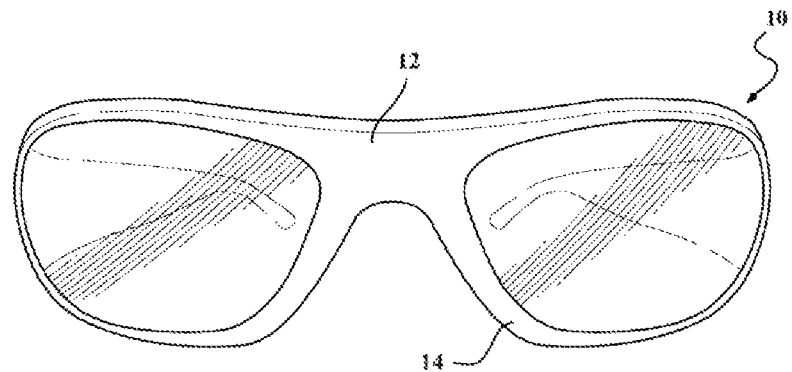
FIG. 13A is a front view of eyewear.
Figure 13B:
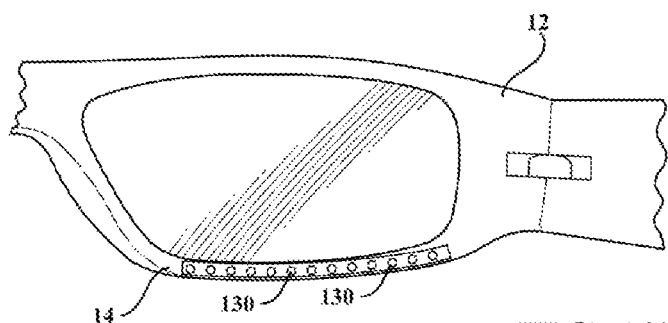
FIG. 13B is a view of an attachable aftermarket strip with rounded protrusions.
Figure 13C:
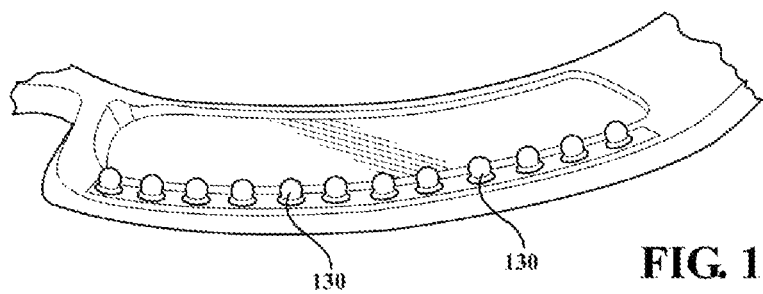
FIG. 13C is a close up of the rounded protrusions.

FIGS. 13A-13C illustrate yet a further aspect of my invention, in which the glasses 10 are fashion glasses made of plastic, and where teeth 130 are made of a grooved material with round rubber heads, and this configuration is located on lower inner frame 14 of glass frame 12. Temple arms 16 do not have any hair securement devices, such as the non-slip pad of previous aspects of the present invention.

FIGS. 14A-14C

Figure 14A:
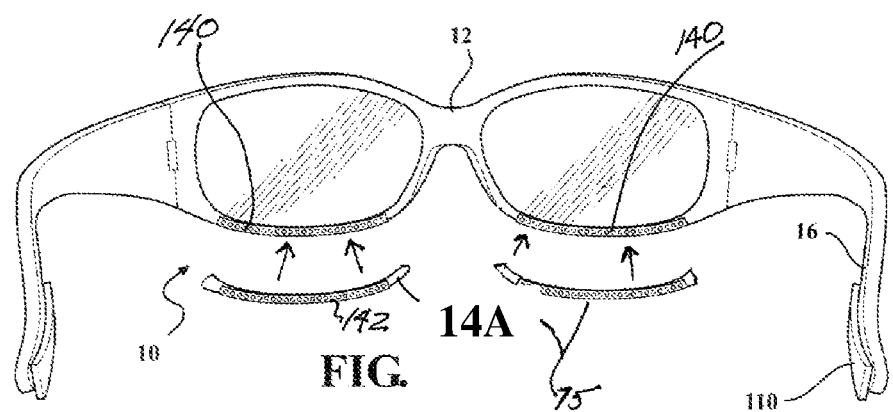
FIG. 14A shows a magnetically adhesive aftermarket strip application for securements.
Figure 14B:
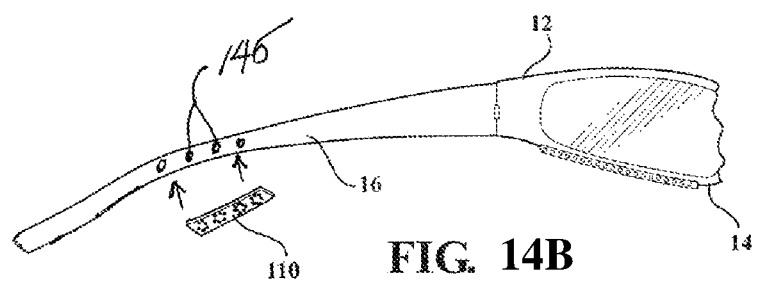
FIG. 14B shows the magnetically attachable inner temple securement.
Figure 14C:
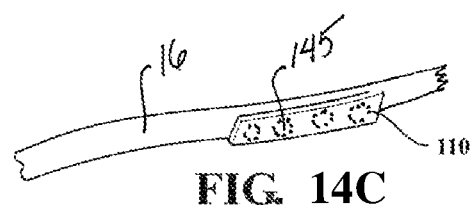
FIG. 14C shows the magnetically attachable inner temple securements held in place.

FIGS. 14A-14C illustrate yet another aspect of my invention, in which, again, glasses 10 are safety glasses, and illustrating a magnetically attached strip set of hair securement devices 75 attached to the frame glass with magnets 140. Magnets 140 are attached to the inner frame or embedded into the frame during manufacture. Hair securement devices 75 acting as teeth, are located on the inner surfaces, top and bottom, respectively, of the glass frame 12 as shown in detail in FIG. 14A. Temple arms 16 also have hair securement devices 10 magnetically attached by magnets 145, such as the non-slip pad of previous aspects of the present invention. FIG. 14C illustrates the temple pad 110 with its magnets 145 attached magnetically to temple arm 16. This magnetically attachable aspect of the invention can be utilized with any of the aspects.

FIGS. 15A-15B

Figure 15A:
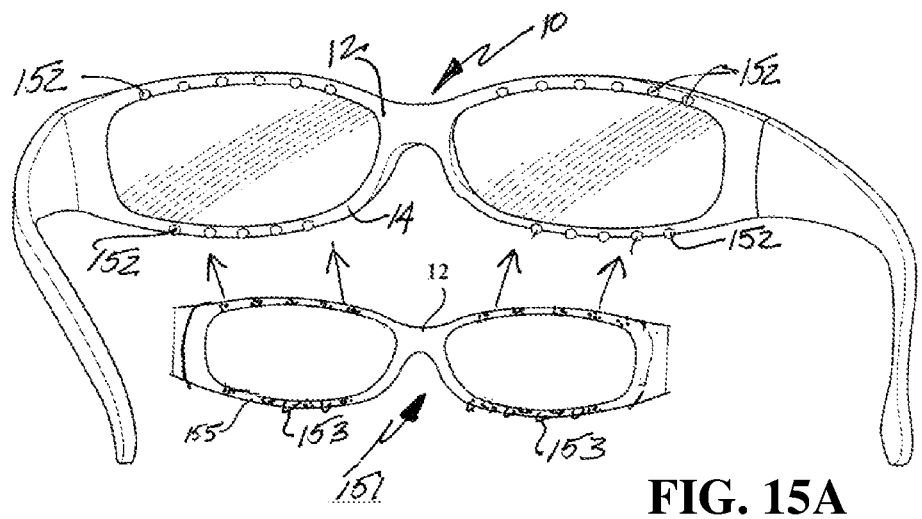
FIG. 15A shows a magnetically attachable complete inner frame with magnets.

FIG. 15A illustrates yet a further aspect of my invention, in which glasses 10 have magnets 152 around the inner frame 14, either adhered to the surface or embedded during manufacture. Secondary frame 151 includes teeth 153 that also include complementary magnets 155 that are also either adhered to the surface or embedded during manufacture. Magnets 152 and 155 are located in complementary locations to the magnets on the eyeglass frame 10 themselves, such that when they mate, teeth 153 acts as a friction material for hair securement, and they are located on lower inner frame 14 of glass frame 12. These teeth can be rubber, coated rubber, or layered with a friction type material to secure in someone's hair to prevent slippage off their head. Temple arms 16 may also include any of the non-slip pads of previous aspects of the present invention.

Figure 15B:
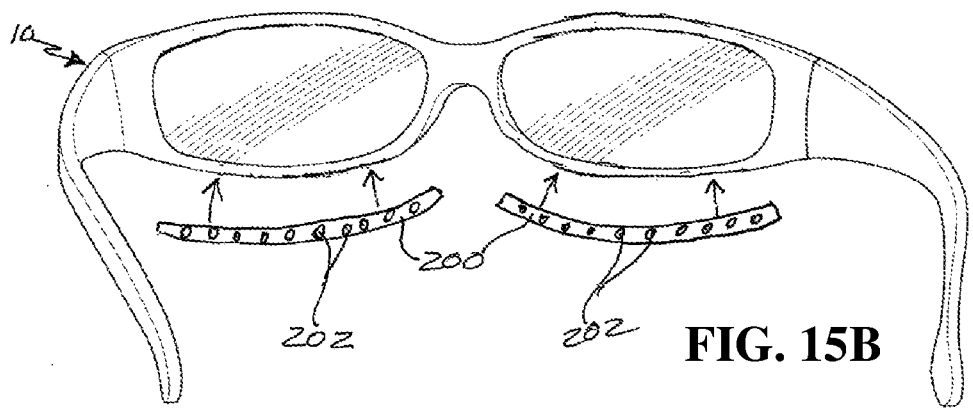
FIG. 15B shows magnetically attachable aftermarket strips with securements.

FIG. 15B illustrates another aftermarket aspect of an attachable strip 200 with teeth 202 adapted to be adhered to the eyeglasses 10 by any number of methods selected from the group consisting of adhesives, magnets, press fit securements, and combinations thereof. The other suitable means for securement are also within the scope of the present invention, and are described in greater detail in previous aspects.

The same principles apply to wholly or partially rimless glasses, where the invention incorporates a u-channel design capable of being adhered to the glasses. Ideally, the u-shape will hug the entire lower inner frame, but must not be intrusive to the user's vision. This same application would apply to safety glasses, with the possible teeth being all the types, sizes and shapes as previously described hereinabove. Metal frame glasses, such as aviator type glasses, may utilize a strip with teeth that could be magnetically or adhesively attached to the metal frame, if it is made of a magnetic material. Any other method of attachment described herein may be suitable.

FIG. 16

Figure 16:
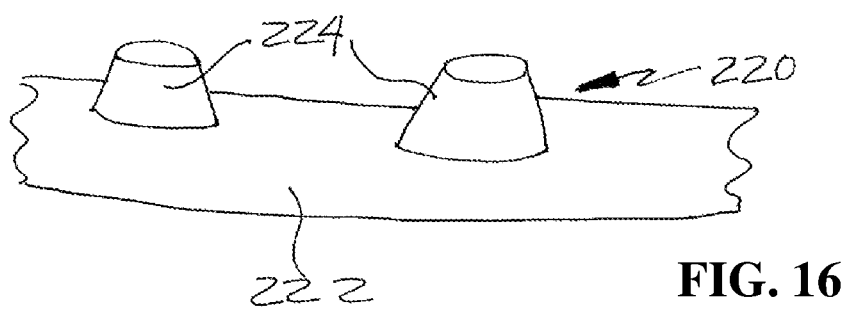
FIG. 16 shows a close up of some frusto-conical teeth in accordance with the present invention.

FIG. 16 is a close up view of the frusto-conically shaped tooth-like device on a strip, as generally denoted by the numeral 220, wherein the adhesive/magnetic/press fit aftermarket hair securement tooth component 224 is an integral part of the strip 222 which can be attached to existing glasses, readers or sunglasses that will include the functional features of the present invention to the existing glasses. FIG. 16 is a perspective view of an add-on piece which would preferably be a pliable, low durometer plastic, rubber or rubber-like type material and adjustable to be attached onto the bottom of glasses, sunglasses, or readers.

The hair securement device strip 222 includes some hair securement devices 224, such as teeth, or decorative pieces that will act as teeth, or any configuration of teeth that will help to secure the glasses in the hair of the wearer. Preferably, the material would be a stretchy material like a gummy hairband, made of rubber, or any other suitably rubber-like stretchy, gummy type material. As discussed hereinabove, the teeth may be of any configuration, including rounded hill-type bumps, frusto-conical tooth bits, cylinders, triangular tubes, ribbed pads of rubber-like material, or protrusions of any shape or dimension. As long as the tooth-like devices 224 are somehow attached to the inner frame of the eyeglasses, they will function in their capacity. Once the grooved hair securement device or attachment piece is positioned around the bottom of the glass lens, it may be held on by friction or secured with either a temporary or permanent adhesive.

In summary, numerous benefits have been described which result from employing any or all of the concepts and the features of the various specific embodiments of the present invention, or those that are within the scope of the invention. The eyeglasses with hair securement devices or the aftermarket hair securement device adapted to be adhered onto the lower inner frame of an existing pair of glasses acts perfectly to prevent some of all of slippage of eyeglasses that have been placed back onto the top of the head of the wearer.

The foregoing description of a preferred embodiment of the invention has been presented for purposes of illustration and description. It is not intended to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

INDUSTRIAL APPLICABILITY

This invention finds utility for use with eyeglasses to prevent slippage of glasses that are being worn on the top of the head, and more particularly, this invention finds utility in the eyeglass industry, so that glasses are not lost by slipping off the head of the person wearing the glasses.

What is claimed is:

1. Eyeglasses that resist slippage on a head of a wearer, comprising:
    an eyeglass frame having a top section and two lower inner frame sections;
    said lower inner frame sections being on both sides of the frame, extending downwardly and inwardly from the top section of the eyeglass frame, and wherein said lower inner frames have an inwardly facing surface;
    temples extending from the eyeglass frame for securing the eyeglasses to the head of the wearer; and
    hair securement devices located on the inwardly facing surface of the lower inner frame sections on either side of the eyeglass frame, said hair securement devices protruding from the lower inner frame sections on either side of the eyeglass frame toward the face of the person wearing the eyeglasses,
    wherein the hair securement devices include teeth-like structures that protrude from the inner frame of the eyeglasses, such that the teeth like structures do not protrude enough to touch the face when worn by the wearer.

2. The eyeglasses of claim 1, wherein the hair securement devices include low profile teeth for securing the eyeglasses into the hair of a wearer so that the glasses are much less likely to slip off the head of the wearer when the eyeglasses are being worn on the top of their head.

3. The eyeglasses of claim 1, wherein the teeth of the hair securement devices are frusto-conical in shape.

4. The eyeglasses of claim 1, wherein the hair securement devices teeth are made of a material selected from the group consisting of soft, semi-soft, hard durometer plastic materials, rubber, rubber-like materials, metals, plastic, thermoplastic elastomers including thermoplastic vulcanizates, elastomers, synthetic rubbers including ethylene propylene diene monomers, polypropylene, acetate, various suitable foams, plastic pearls, rhinestones, decorative elements, and combinations thereof.

5. The eyeglasses of claim 1, wherein the hair securement devices are made of a smoothly surfaced bump-like protrusion.

6. The eyeglasses of claim 1, wherein the hair securement devices are shaped with an aspect ratio of from 0.001 to 1000.

7. The eyeglasses of claim 1, wherein the hair securement devices are included in a frame that snaps onto the inwardly facing surface of the eyeglasses.

8. The eyeglasses of claim 1, wherein the hair securement devices protrude from an attachable strip adapted to be adhered to the eyeglasses by a method selected from the group consisting of adhesives, magnets, press fit securements, and combinations thereof.

9. The eyeglasses of claim 1, further comprising hair securement devices located on the inner side of the temples of the eyeglasses.

10. The eyeglasses of claim 1, wherein the hair securement devices are collectively located on the top and bottom inner frames of the eyeglasses and on the inner side of the temples.

11. A method of using eyeglasses having the hair securement device of claim 1, comprising:
    providing eyeglasses having the hair securement device of claim 1 onto the face of a wearer;
    sliding the provided eyeglasses having hair securement device teeth thereon onto the top of their head;
    engaging the hair securement device into the hair of the person wearing the eyeglasses; and
    securing the hair securement device into the hair.

12. A hair securement device, comprising:
    a plurality of teeth-like devices on a strip to secure hair, said hair securement device being adapted to be secured on the inwardly facing surface of lower inner frame sections of an eyeglass frame, said teeth-like devices of the strip being adapted for protruding toward the face of the person wearing the eyeglasses such that the teeth like devices of the strip do not protrude enough to touch the face when worn by the wearer, and wherein the hair securement device includes low profile teeth for securing to the inwardly facing surface of a lower inner frame of a pair of eyeglasses, such that when the plurality of teeth-like devices on a strip is secured to the eyeglasses and the eyeglasses are slid back into the hair of a wearer, the glasses are much less likely to slip off the head of the wearer.

13. The hair securement device of claim 12, wherein the teeth of the hair securement device are frusto-conical in shape.

14. The hair securement device of claim 12, wherein the teeth of the hair securement device are made of a material selected from the group consisting of soft, semi-soft, hard durometer plastic materials, rubber, rubber-like materials, metal, plastic, plastic pearls, rhinestones, decorative elements, and combinations thereof.

15. The hair securement device of claim 12, wherein the teeth of the hair securement device are integral with an attachable strip adapted to be adhered to eyeglasses by a method selected from the group consisting of adhesives, magnets, press fit securements, and combinations thereof.

16. The hair securement device of claim 12, wherein the teeth of the hair securement device are shaped with an aspect ratio of from about 0.001 to about 1000.

17. A method of making eyeglasses having frames, comprising:
    forming a plurality of teeth-like devices in the inner frames of a pair of eyeglasses that are formed to protrude inwardly toward the face of the wearer, wherein said step of forming teeth-like devices located on the inwardly facing surface of the lower inner frame sections on either side of the eyeglass frame is accomplished by forming said teeth-like devices protruding from the lower inner frame sections on either side of the eyeglass frame toward the face of the person wearing the eyeglasses, such that, when worn, the teeth like devices do not protrude enough to touch the face when worn by the wearer.

18. The method of claim 17, further comprising an additional step of forming integral hair securement devices on the inner side of the inner temples of the eyeglasses.

* * * * *